United States Patent [19]

Ito

[11] Patent Number: 5,573,273
[45] Date of Patent: Nov. 12, 1996

[54] TILT STEERING DEVICE

[75] Inventor: Nobuyasu Ito, Kariya, Japan

[73] Assignee: Kabushiki Kaisha Toyoda Jidoshokki Seisakusho, Kariya, Japan

[21] Appl. No.: 453,881

[22] Filed: May 30, 1995

[30] Foreign Application Priority Data

Jun. 3, 1994 [JP] Japan ................................. 6-122814

[51] Int. Cl.$^6$ ............................. B62D 1/18; B60K 37/04
[52] U.S. Cl. ............................... 280/775; 180/90; 74/493
[58] Field of Search .................................. 280/775, 779, 280/780; 180/334, 90; 74/493

[56] References Cited

U.S. PATENT DOCUMENTS

| | | | |
|---|---|---|---|
| 4,660,673 | 4/1987 | Yoshii | 280/775 |
| 5,088,342 | 2/1992 | Bening et al. | 280/775 |
| 5,333,701 | 8/1994 | Izumi | 180/90 |

FOREIGN PATENT DOCUMENTS

| | | |
|---|---|---|
| 57-3072 | 1/1982 | Japan . |
| 58-3322 | 6/1983 | Japan . |
| 62-162170 | 10/1987 | Japan . |

Primary Examiner—Anne Marie Boehler
Assistant Examiner—Peter C. English
Attorney, Agent, or Firm—Brooks Haidt Haffner & Delahunty

[57] ABSTRACT

A tilt steering device includes an instrument panel having an inserting hole formed on the upper surface thereof and a forward and rearward movably disposed steering column which projects upwardly of the instrument panel through the inserting hole of the instrument panel. A meter box is mounted on the steering column above the instrument panel and a rubber boot for covering the space between the instrument panel and the meter box is fixed to the lower portion of the meter box. The rubber boot is arranged such that the lower end portion thereof slides on the upper surface of the instrument panel in accordance with the movement of the steering column.

25 Claims, 3 Drawing Sheets

TILT STEERING DEVICE

BACKGROUND OF THE INVENTION

1. Field of the Invention

The present invention relates to a tilt steering device.

2. Description of the Related Art

Conventionally, there is a tilt steering device for a forklift capable of adjusting a position of a steering wheel by tilting in accordance with the height and driving posture of a driver. The tilt steering device can be fixed at any optional position by moving a steering column in the forward and rearward directions about the base of the steering device as a fulcrum.

As shown in FIG. 6, a steering device 21 includes a steering wheel 23 and a steering column 24 each disposed above an instrument panel 22 and the steering column 24 is used to hold a steering shaft (not shown) connected to the steering wheel 23. A meter box 25 is mounted on the steering column 24. A rubber boot 26 covers the space between the lower portion of the meter box 25 and the instrument panel 22. The front portion of the rubber boot 26 is fixed to the front portion of the instrument panel 22 and the rear portion of the rubber boot 26 comes into contact with the rear portion of the instrument panel 22.

When the meter box 25 is moved forward and rearward in association with the steering device 21 in a tilt operation, the rubber boot 26 is deflected and deformed in accordance with the movement of the meter box 25 due to a bellows shape of the rubber boot 26.

With this arrangement, the rubber boot 26 seals the lower portion of the meter box 25 and protects accommodating parts such as harnesses disposed to the lower portion of the meter box 25 and in the instrument panel 22 from foreign substances such as water, dust and the like.

However, since the number of the accommodating parts disposed to the lower portion of the meter box 25 and in the instrument panel 22 has been increasing, the available space; in the portion covered with the rubber boot 26 is decreasing. Thus, when the rubber boot 26 is used, there is a risk that the inside surface of the rubber boot 26 interferes with the accommodating parts due to the deformation of the rubber boot 26 during in a tilt operation. As a result, the tilt operation angle of the steering device 21 cannot be set to a large value. Further, a problem arises in that since the rubber boot 26 is greatly deformed by the interference of the rubber boot 26 with the accommodating parts, the accommodating parts covered with the rubber boot 26 are exposed and foreign substances such as water, dust and the like intrude thereinto.

SUMMARY OF THE INVENTION

An object of the present invention is to provide a tilt steering device capable of preventing the interference of accommodating parts in a tilt operation and sealing the space between the lower portion of a meter box and an instrument panel even if many accommodating parts such as harnesses and the like are disposed to the lower portion of the meter box and in the instrument panel.

The tilt steering device according to the present invention comprises an instrument panel having an inserting hole formed on the upper surface thereof, a forward and rearward movably disposed steering column projecting upwardly of the instrument panel through the inserting hole of the instrument panel, a meter box mounted on the steering column above the instrument panel, and a seal member fixed to the lower portion of the meter box to cover the space between the instrument panel and the meter box and having a lower end portion disposed slidably with respect to the upper surface of the instrument panel in accordance with the movement of the steering column.

DESCRIPTION OF PREFERRED EMBODIMENTS

Embodiments of the present invention will be described below with reference to the attached drawings.

Figure 1:
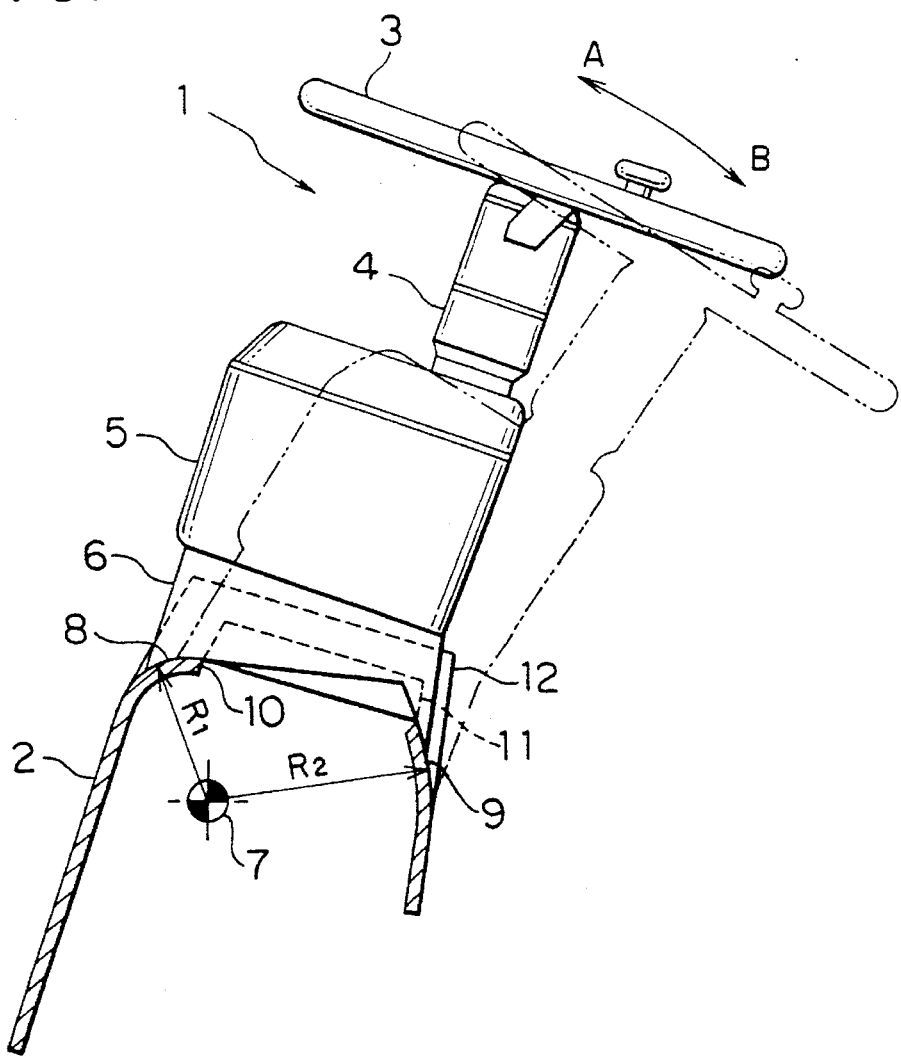
FIG. 1 is a side elevational view showing a tilt steering device according to an embodiment of the present invention.

FIG. 1 shows an embodiment in which a tilt steering device according to the present invention is applied to a forklift. A steering device 1 for carrying out a steering operation is disposed above an instrument panel 2. The steering device 1 includes a steering wheel 3 connected to a steering shaft (not shown) projecting upward from the inside of the instrument panel 2 and a steering column 4 for holding the steering shaft. A meter box 5 is mounted on the steering column 4 and a rubber boot 6 as a seal member is fixed to the lower portion of the meter box 5 to cover the space between the meter box 5 and the instrument panel 2. The lower end portion of the rubber boot 6 is not fixed to the instrument panel 2 but is slidably abutted against the upper surface of the instrument panel 2.

The steering device 1 can be fixed at any optional position by moving the steering column 4 in the forward and rearward directions about a center of rotation 7 as a fulcrum provided at the base of the steering device 1. Since the meter box 5 and the rubber boot 6 are mounted on the steering column 4, they are moved in the forward and rearward directions in association with the steering device 1 in a tilt operation.

Figure 2:
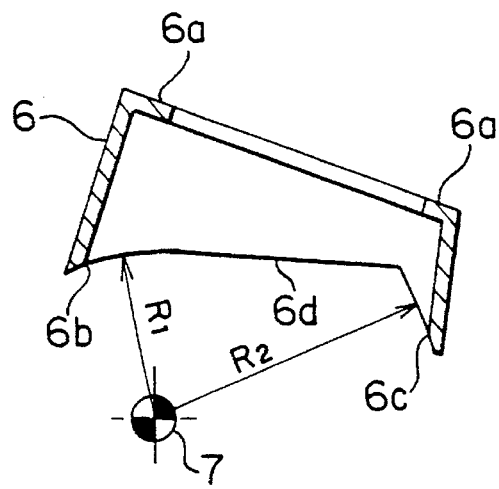
FIG. 2 is a side cross sectional view showing a rubber boot used in the embodiment of FIG 1.

FIG. 2 shows a side elevational view of the rubber boot 6. The rubber boot 6 is composed of a square pipe member through which the steering column 4 passes with fixing pieces 6a to be fixed to the meter box 5 formed to the opening at the upper end of the rubber boot 6. The front lower end portion 6b of the rubber boot 6 is formed to a curved-shape having a radius R1 centered on the center of rotation 7 of the steering device 1. Further, the rear lower end portion 6c of the rubber boot 6 is formed to a curved-shape having a radius R2 centered on the center of rotation 7 of the steering device 1. The side lower end portions 6d of the rubber boot 6 between the front lower end portion 6b and the rear lower end portion 6c thereof are cut out in order not to interfere with the instrument panel 2 even if the rubber boot 6 is moved forward and rearward, so that the movement of the rubber boot 6 is not disturbed.

Figure 3:
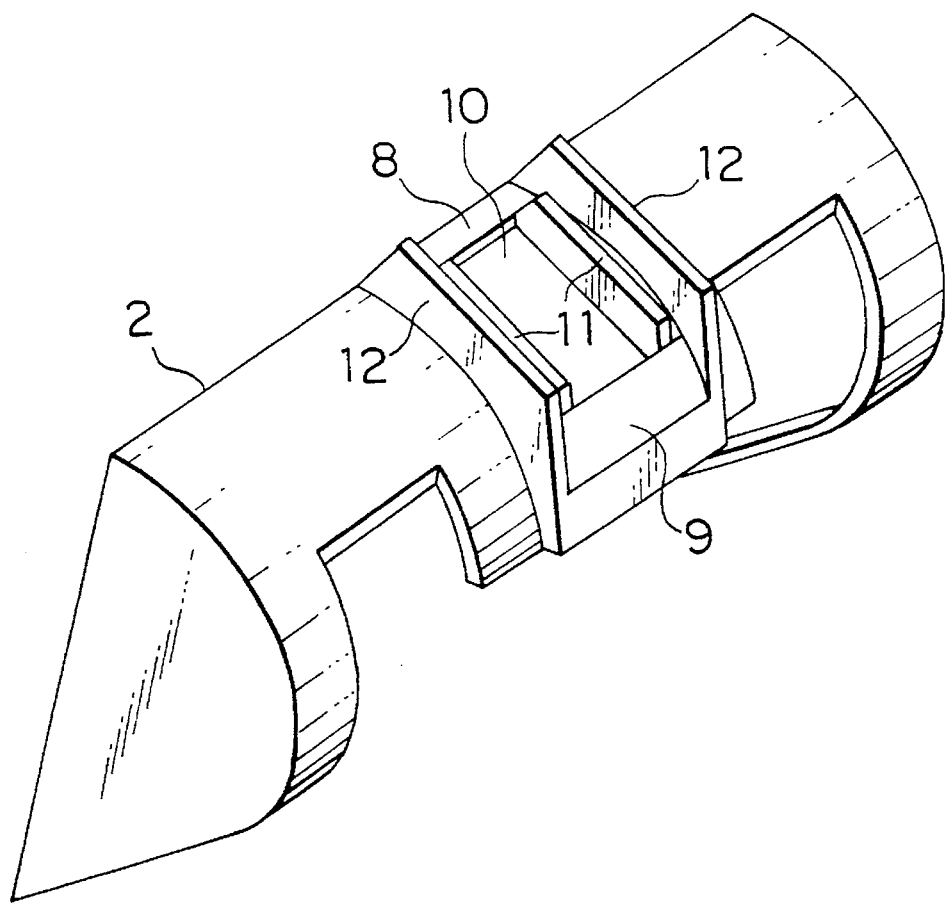
FIG. 3 is a perspective view showing an instrument panel used in the embodiment of FIG. 1.
Figure 4:
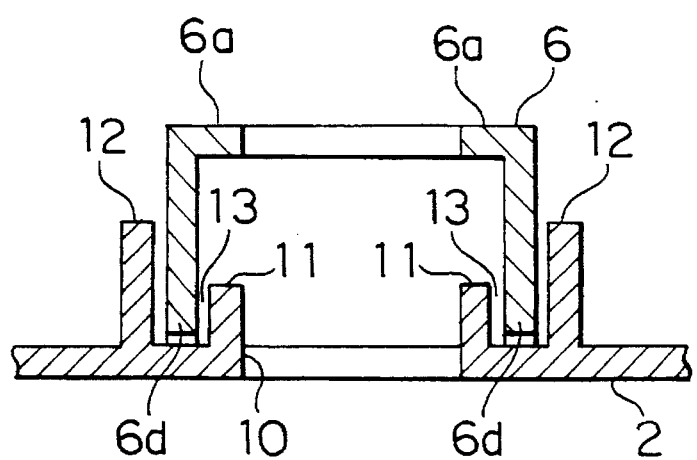
FIG. 4 is a longitudinal cross sectional view showing the state in which the rubber boot and the instrument panel are assembled in the embodiment of FIG. 1.

As shown in FIG. 3, a steering column inserting hole 10 is defined to a portion of the upper central surface of the instrument panel 2 on which the steering device 1 is mounted so that the steering column 4 and accommodating parts such as harnesses passes therethrough. Sliding surfaces 8, 9 on which the rubber boot 6 slides are formed on the front and rear portions of the steering column inserting hole 10 of the instrument panel 2, respectively. The front sliding surface 8 and the rear sliding surface 9 are formed to curved-shapes having the same radii as those of the front lower end portion 6b and the rear lower end portion 6c of the rubber boot 6, respectively. That is, as shown in FIG. 1, the front sliding surface 8 is formed to the curved-shape having the radius R1 centered on the center of rotation 7 of the steering device 1 and the rear sliding surface 9 is formed to the curved-shape having the radius R2 centered on the center of rotation 7 of the steering device 1. As shown in FIG. 3, an inside wall 11 and an outside wall 12 serving as protection walls are formed on each of the right and left sides of the steering column inserting hole 10 of the instrument panel 2. As shown in FIG. 4, each of the side lower end portions 6d of the rubber boot 6 is engaged with a groove 13 formed between the inside wall 11 and the outside wall 12. The inside walls 11 and the outside walls 12 are formed to such shapes as to cover the side lower end portions 6d of the rubber boot 6 at all times when the rubber boot 6 moves forward and rearward.

Next, the operation of the steering device 1 arranged as described above will be described below.

As shown in FIG. 1, the steering device 1 is tilted from a position A to a position B to adjust a position at which the steering wheel 3 is set in accordance with the height and driving posture of a driver. Thus, the steering device 1 is moved rearward about the center of rotation 7 as the fulcrum provided at the base of the steering device 1. Since the meter box 5 and the rubber boot 6 are also mounted on the steering column 4, they are also moved rearward similarly to the steering device 1. At this time, since the front lower end portion 6b and the rear lower end portion 6c of the rubber boot 6 as well as the front sliding surface 8 and the rear sliding surface 9 of the instrument panel 2 are formed to the curved-shapes having the radii R1, R2 each centered on the center of rotation 7 of the steering device 1 respectively, the front lower end portion 6b and rear lower end portion 6c of the rubber boot 6 make a sliding operation in the state that they are in contact with the front sliding surface 8 and rear sliding surface 9 of the instrument panel 2. Further, since each of the side lower end portions 6d of the rubber boot 6 is engaged with the groove 13 formed by the inside wall 11 and the outside wall 12, when moved the side lower portions 6d of the rubber boot 6 are moved in the state are held between and covered by the inside walls 11 and the outside walls 12.

When the steering device 1 is tilted from the position B to the position A, the front lower end portion 6b and rear lower end portion 6c of the rubber boot 6 also make a sliding operation in the state that they are in contact with the front sliding surface 8 and rear sliding surface 9 of the instrument panel 2 and the side lower portions 6d of the rubber boot 6 are moved in the state that they are held between and covered with the inside walls 11 and the outside walls 12, likewise.

Consequently, since the steering device 1 of this embodiment is arranged such that the lower end of the rubber boot 6 is moved forward and rearward in association with the steering device 1 in a tilt operation, the rubber boot 6 itself maintains the shape thereof as it is. With this arrangement, since the rubber boot 6 does not interfere with the accommodating parts such as the harnesses, a large tilt operation angle of the steering device 1 can be secured. Further, since the front lower end portion 6b and rear lower end portion 6c of the rubber boot 6 slide on the front sliding surface 8 and rear sliding surface 9 of the instrument panel 2 and each of the side lower end portions 6d of the rubber boot 6 is moved in the state that it is covered with the inside wall 11 and outside wall 12, the rubber boot 6 can perfectly seal the space between the lower portion of the meter box 5 and the instrument panel 2 and thus protect the accommodating parts such as the harnesses disposed to the lower portion of the meter box 5 and in the instrument panel 2. Moreover, since the rubber boot 6 is used as a seal member for the lower portion of the meter box 5, the area of intimate contact between the rubber boot 6 and the instrument panel 2 can be increased. In particular, an increase of the sealing area to compass the space between the lower portion of the meter box 5 and the instrument panel 2 achieves a large improvement in the protection against intrusion of rain in such a vehicle as a forklift which is often left outside of a building.

The present invention is not limited to the aforesaid embodiment but may be arranged as described below so long as it does not depart from the gist of the present invention.

(1) Although the inside walls 11 and the outside walls 12 are provided with the instrument panel 2 to cover the side lower end portions 6d of the rubber boot 6 in the above embodiment, the space between the lower portion of the meter box and the instrument panel 2 can be sealed even if only the inside walls 11 are provided with the instrument panel 2 and thus the structure of the instrument panel 2 can be simplified.

(2) Although the rubber boot 6 is provided as the seal member for the lower portion of the meter box 5 in the above embodiment, the rubber boot 6 need not be deformed. Thus, rigidity can be increased by the use of a plastic material or the like in place of the elastic material such as rubber. Further, when the elastic material such as rubber is used only to a portion in contact with the instrument panel 2, the intimate contact property thereof with the instrument panel 2 can be also increased.

Figure 5:
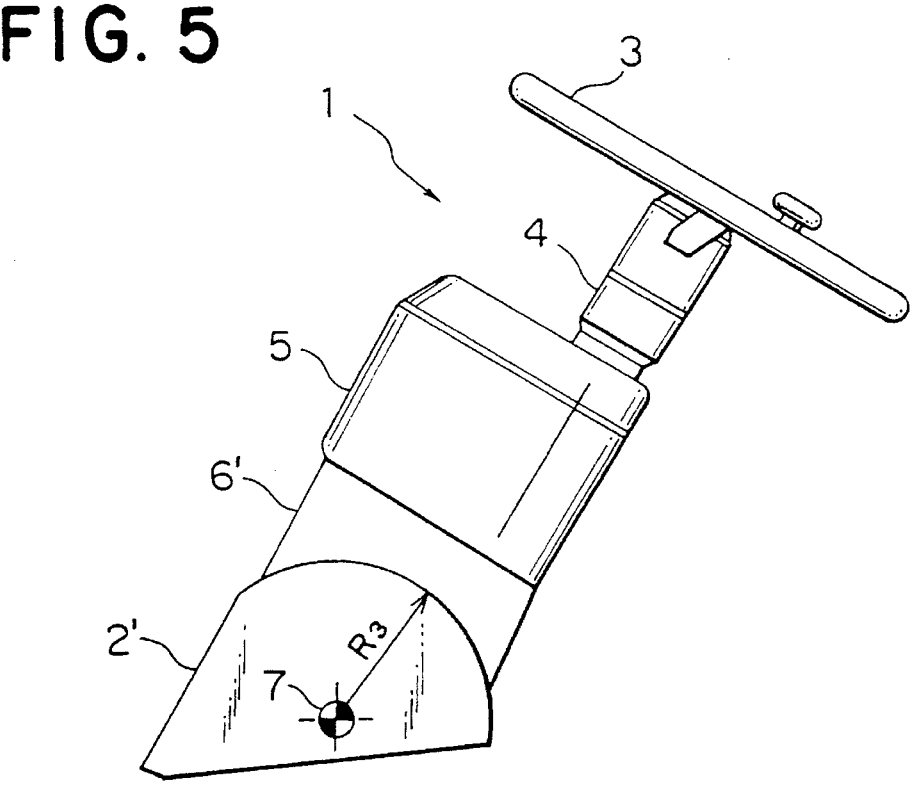
FIG. 5 is a side elevational view showing a tilt steering device according to another embodiment.
Figure 6:
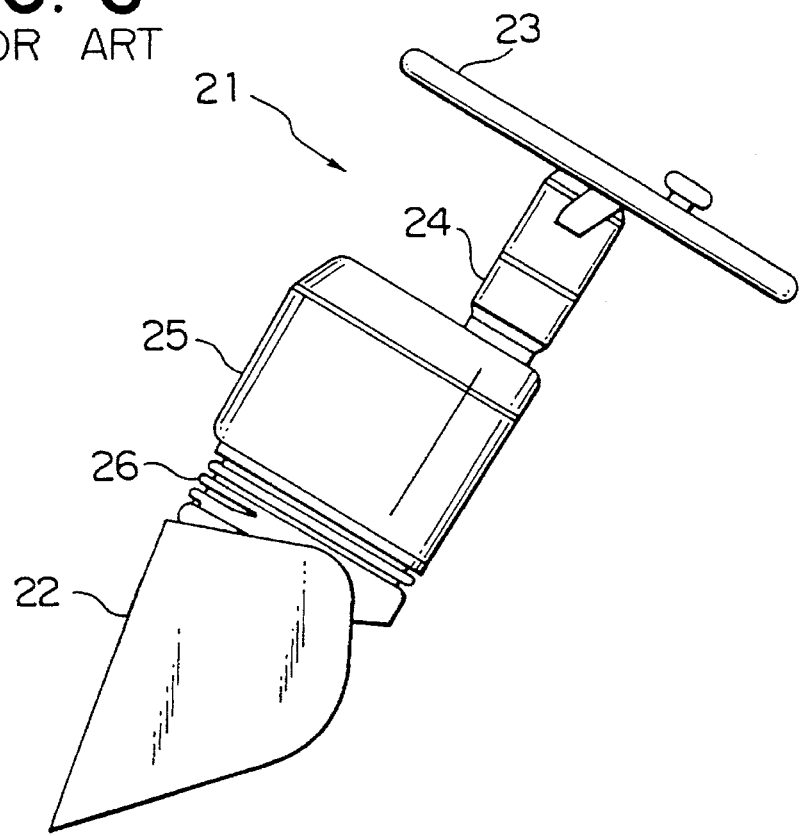
FIG. 6 is a side elevational view showing a conventional tilt steering device.

(3) Although the front lower end portion 6b and the rear lower end portion 6c of the rubber boot 6 as well as the front sliding surface 8 and the rear sliding surface 9 of the instrument panel 2 are formed to the curved-shapes having the different radii R1 and R2 each centered on the center of rotation 7 of the steering device 1, respectively in the above embodiment, each of the lower end of the rubber boot 6' and the sliding surface of the instrument panel 2' may be set to a curved-surface having the same radius R3 centered on the center of rotation 7 of the steering device 1 as shown in FIG. 5. With this arrangement, since the side lower end portion of the rubber boot 6' also makes a sliding operation in the state that it is in contact with the instrument panel 2' in a tilt operation, sealing can be more perfectly carried out. Further, since the inside walls 11 and outside walls 12 need not be provided with the instrument panel 2', the structure of the instrument panel 2' can be simplified.

(4) Although the above embodiment describes the tilt steering device applied to a forklift, the tilt steering device of the present invention is not limited thereto but applicable to various types of vehicles.

What is claimed is:

1. A tilt steering device comprising:
    an instrument panel comprising an upper surface having a front panel portion, a rear panel portion and an inserting hole;

a steering column projecting upwardly from said instrument panel through the inserting hole, said steering column being tiltable in the forward and rearward directions about a center of rotation defined by a fulcrum located within a region defined by the instrument panel;

a meter box mounted on said steering column above and spaced from said instrument panel, said meter box having a lower portion; and a seal member fixed to said lower portion of said meter box to cover the space between said instrument panel and said meter box, said seal member having a lower end portion disposed slidably with respect to the upper surface of said instrument panel when said steering column is tilted, said lower end portion having a front sealing portion and a rear sealing portion wherein the front sealing portion slides on the front panel portion and the rear sealing portion slides on the rear panel portion; and the front sealing portion and the front panel portion each have essentially a same first radius of curvature centered on the fulcrum, and the rear sealing portion and the rear panel portion each have essentially a same second radius of curvature centered on the fulcrum, the second radius of curvature being different from the first radius of curvature.

2. A tilt steering device according to claim 1, wherein said seal member comprises a square pipe member which slides on the front panel portion and rear panel portion.

3. A tilt steering device according to claim 2, wherein the inserting hole has opposing sides and said instrument panel further comprises a pair of protection walls disposed along the opposing sides of said inserting hole.

4. A tilt steering device according to claim 3, wherein said lower end portion of said seal member further comprises inner sides and said protection walls include inside walls formed along the inner sides.

5. A tilt steering device according to claim 3, wherein said lower end portion of said seal member further comprises outer sides and said protection walls include outside walls formed along the outer sides.

6. A tilt steering device according to claim 1, wherein said seal member is composed of an elastic member.

7. A tilt steering device according to claim 1, wherein said seal member is composed of plastics.

8. A tilt steering device comprising:

an instrument panel comprising an upper surface having a front panel portion, a rear panel portion and an inserting hole;

a steering column projecting upwardly from the instrument panel through the inserting hole, the steering column being movable in the forward and rearward directions;

a meter box mounted on the steering column above and spaced from the instrument panel, the meter box having a lower portion;

a seal member fixed to the lower portion of the meter box to cover the space between the instrument panel and the meter box and having a lower end portion with inner and outer sides, the lower end portion slidably engaging the upper surface of the instrument panel during movement of the steering column; and the instrument panel further comprising a pair of protection walls formed along the inner sides of the lower end portion of said seal member.

9. A tilt steering device according to claim 8, wherein said steering column is tiltable in the forward and rearward directions about a center of rotation defined by a fulcrum located within a region defined by the instrument panel.

10. A tilt steering device according to claim 9, wherein the lower end portion of the seal member comprises a front sealing portion and a rear sealing portion, wherein the front sealing portion slides on the front panel portion and the rear sealing portion slides on the rear panel portion when the steering column is tilted, the front sealing portion and the front panel portion each having essentially a same first radius of curvature centered on the fulcrum and the rear sealing portion and the rear panel portion each having essentially a same second radius of curvature centered on the fulcrum.

11. A tilt steering device according to claim 10, wherein the first radius of curvature and the second radius of curvature are different.

12. A tilt steering device according to claim 10, wherein the first radius of curvature and the second radius of curvature are the same.

13. A tilt steering device according to claim 12, wherein the upper surface of the instrument panel has a semi-cylindrical shape and the entire region of the lower end portion of the seal member slides on the upper surface of the instrument panel when the steering column is tilted.

14. A tilt steering device according to claim 8, further comprising a pair of outside protection walls formed the outer sides of the side lower end portion of the seal member.

15. A tilt steering device according to claim 14, wherein said seal member comprises a square pipe member which slides on the front panel portion and the rear panel portion.

16. A tilt steering device according to claim 8, wherein the seal member is composed of an elastic member.

17. A tilt steering device according to claim 8, wherein said seal member is composed of plastic.

18. A tilt steering device comprising:

an instrument panel comprising an upper surface having a front panel portion, a rear panel portion and an inserting hole;

a steering column projecting upwardly from the instrument panel through the inserting hole of the instrument panel, the steering column being movable in the forward and rearward directions;

a meter box mounted on the steering column above and spaced from the instrument panel, the meter box having a lower portion;

a seal member fixed to the lower portion of the meter box to cover the space between the instrument panel and the meter box and having a lower end portion with inner and outer sides, the lower end portion slidably engaging the upper surface of the instrument panel during movement of said steering column; and the instrument panel further comprising a pair of outside walls formed along the outer sides of the lower end portion of the seal member.

19. A tilt steering device according to claim 18, wherein the steering column is tiltable in the forward and rearward directions about a center of rotation defined by a fulcrum located within a region defined by the instrument panel.

20. A tilt steering device according to claim 19, wherein the lower end portion of the seal member comprises a front sealing portion and a rear sealing portion, wherein the front sealing portion slides on the front panel portion of the instrument panel and the rear sealing portion slides on the rear panel portion, the front sealing portion and the front panel portion having essentially a same first radius of curvature centered on the fulcrum and the rear sealing portion and the rear panel portion having essentially a same second radius of curvature centered on the fulcrum.

21. A tilt steering device according to claim 20, wherein the first radius of curvature and the second radius of curvature are different.

22. A tilt steering device according to claim 20, wherein the first radius of curvature and the second radius of curvature are the same.

23. A tilt steering device according to claim 22, wherein the upper surface of said instrument panel has a semi-cylindrical shape and the entire region of the lower end portion of the seal member slides on the upper surface of the instrument panel when the steering column is tilted.

24. A tilt steering device according to claim 18, wherein said seal member is composed of an elastic member.

25. A tilt steering device according to claim 18, said seal member is composed of plastic.

* * * * *

UNITED STATES PATENT AND TRADEMARK OFFICE
CERTIFICATE OF CORRECTION

PATENT NO. : 5,573,273
DATED : November 12, 1996
INVENTOR(S) : N. Ito

It is certified that error appears in the above-indentified patent and that said Letters Patent is hereby corrected as shown below:

Column 1, line 39, after "space" delete semi-colon ";";
line 43, after "during" delete "in".

Column 3, line 50, delete "are moved in the state".

Column 4, line 18, "compass" should read --encompass--;
line 29, after "box" insert --5--.

Column 5, line 44, change "plastics" to --plastic--.

Column 6, line 26, after "formed" insert --along--;
line 27, before "lower" delete "side".

Signed and Sealed this

First Day of April, 1997

Attest:

BRUCE LEHMAN

Attesting Officer

Commissioner of Patents and Trademarks